(12) United States Patent
Kaya

(10) Patent No.: US 8,993,653 B2
(45) Date of Patent: Mar. 31, 2015

(54) BIODEGRADABLE POLYMERS AND METHODS FOR THE PREPARATION THEREOF

(75) Inventor: Mustafa Kaya, Luxembourg (LU)

(73) Assignee: Nutripol Capital SARL, Luxembourg (LU)

( * ) Notice: Subject to any disclaimer, the term of this patent is extended or adjusted under 35 U.S.C. 154(b) by 252 days.

(21) Appl. No.: 13/576,359

(22) PCT Filed: Feb. 10, 2010

(86) PCT No.: PCT/EP2010/051663
§ 371 (c)(1),
(2), (4) Date: Sep. 25, 2012

(87) PCT Pub. No.: WO2011/098122
PCT Pub. Date: Aug. 18, 2011

(65) Prior Publication Data
US 2013/0046044 A1    Feb. 21, 2013

(51) Int. Cl.
C08L 33/02     (2006.01)
C08K 5/1545    (2006.01)
B29C 49/00     (2006.01)
B29C 43/00     (2006.01)
B29C 51/00     (2006.01)
B29C 45/00     (2006.01)
C08G 63/668    (2006.01)
C08G 63/78     (2006.01)

(52) U.S. Cl.
CPC .............. *C08G 63/668* (2013.01); *C08G 63/78* (2013.01)

USPC .............. 523/122; 523/128; 524/56; 524/58; 264/328.1; 264/331.11

(58) Field of Classification Search
CPC ...... C08G 63/78; C08G 63/668; C08L 33/02; C08L 5/00; C08K 5/1545; B29C 49/00; B29C 51/00; B29C 45/00
USPC ............ 523/122, 128; 524/56, 58; 264/328.1, 264/331.11
See application file for complete search history.

(56) References Cited

U.S. PATENT DOCUMENTS

| | | |
|---|---|---|
| 2002/0132918 A1 | 9/2002 | Kishi et al. |
| 2004/0234608 A1 | 11/2004 | Fleshner-Barak et al. |
| 2006/0052577 A1 | 3/2006 | Swift et al. |

*Primary Examiner* — Kriellion Sanders
(74) *Attorney, Agent, or Firm* — Edward J. Baba; Daniel Stoddard; Bozicevic, Field & Francis LLP

(57) ABSTRACT

The present invention relates to biodegradable polymers, and especially polyacrylic and/or polyaspartic acid based biodegradable polymers. Further, the present invention relates to methods for the preparation of the present biodegradable polymers and the use thereof as, for example, protective layer or packaging material. Specifically, the present invention relates to methods for preparing a biodegradable polymer comprising: a) preparing an acidic mixture of polyacrylic and/or polyaspartic acid, sodium ions, one or more oligosaccharides, or derivatives thereof, and water, wherein the resulting mixture has a pH equal to or lower than 5; b) maintaining the temperature of said acidic mixture in a range of from 80° C. to 130° C. until an homogeneous suspension is obtained; and c) adding polyvinyl alcohol (PVA) and one or more polycarboxylic acids, or derivatives thereof, to the mixture of step (b) while maintaining the temperature in a range of from 80° C. to 130° C. until the biodegradable polymer is formed.

24 Claims, 3 Drawing Sheets

BIODEGRADABLE POLYMERS AND METHODS FOR THE PREPARATION THEREOF

The present invention relates to biodegradable polymers, and especially polyacrylic and/or polyaspartic acid based biodegradable polymers. Further, the present invention relates to methods for the preparation of the present biodegradable polymers and the use thereof as, for example, protective layer or packaging material.

Polymers are generally used in modern societies in a large variety of technical fields such as for packaging, medical applications, automotive industry, aviation, and common house-hold applications. However, the ever increasing use of polymers is accompanied by serious environmental issues.

Generally used polymers, such as polyethylene, are in most cases petroleum based, or derived. The use of petroleum, or fossil fuel, based polymers ultimately results in, for example, phthalate, phosphate, and carcinogenic contaminations of the environment and high carbon dioxide emissions upon combustion. Accordingly, recycling of polymers is a good option to obviate the above environmental problems, however this option is generally only available for a limited class of polymers such as high density polymers.

Another option to avoid the above indicated environmental problems are biodegradable, or compostable, polymers. In general biodegradable, or compostable, polymers are polymers which can be readily degraded by, for example, microorganisms, into their basic constituting components. In most cases, these basic constituting components are reabsorbed into the food chain as nutrients or other additives either by the decomposing organisms themselves or other organisms.

At least partially replacing petroleum, or fossil fuel, based polymers by biodegradable polymers will result in a significant reduction of environmental pollution.

Presently, there are two main types of biodegradable polymers, or plastics, available: hydro-biodegradable plastics (HBP) and oxo-biodegradable plastics (OBP). Both will first undergo chemical degradation by oxidation and hydrolysis for oxo- and hydro-biodegradable plastics respectively. This results in their physical disintegration and a drastic reduction in their molecular weights. These smaller, lower molecular weight fragments are then amenable to biodegradation.

HBP tend to degrade and biodegrade somewhat more quickly than OBP, but the end result is the same—both are converted to carbon dioxide, water and biomass. OBP are generally less expensive, possess better physical properties and are easier to process on current plastics processing equipment than HBP.

Polyesters play a predominant role as hydro-biodegradable plastics due to their potentially hydrolysable ester bonds. HBP can be made from renewable resources such as corn, wheat, sugar cane, or non-renewable resources (petroleum-based), or blend of these two. Some of the commonly used polymers include PHA (polyhydroxyalkanoates), PHBV (polyhydroxybutyrate-valerate), PLA (polylactic acid), PCL (polycaprolactone), PVA (polyvinyl alcohol) and PET (polyethylene terephthalate).

Despite the availability of biodegradable polymers, there is a continuing need in the art for more biodegradable polymers and especially biodegradable polymers which, besides their biodegradable properties, also provide other beneficial properties, often provided by petroleum based polymers, such as strength, oxidation stability, thermal stability, transparency, or even full biodegradability, i.e., the complete conversion of the polymer into water, carbon dioxide and biomass by, for example, microorganisms optionally in combination with physical environmental factors such as ultraviolet light, oxygen, temperature and/or acidity.

Considering the above, it is an object, amongst other objects, of the present invention to provide novel biodegradable polymers with beneficial properties at least partially, if not completely, resolving the above indicated problems.

This object, amongst other objects, is met by the present invention by providing novel biodegradable polymers and methods for the preparation thereof. The biodegradable polymers according to the present invention additionally provide, besides a substantially complete biodegradability without residual toxic components, additional beneficial, and surprising, characteristics such as, amongst others, thermal stability, resistance to oxidation, and/or high mechanical resistance or strength.

Specifically, the above object, amongst other objects, is met, according to a first aspect of the present invention, by methods for preparing a biodegradable polymer comprising:

a) preparing an acidic mixture of polyacrylic and/or polyaspartic acid, sodium ions, one or more oligosaccharides, or derivatives thereof, and water, wherein the resulting mixture has a pH equal to or lower than 5;

b) maintaining the temperature of said acidic mixture in a range of from 80° C. to 130° C. until an homogeneous suspension is obtained;

c) adding polyvinyl alcohol (PVA) and one or more polycarboxylic acids, or derivatives thereof, to the mixture of step (b) while maintaining the temperature in a range of from 80° C. to 130° C. until the biodegradable polymer is formed.

Polyacrylic acid comprises a repetitive structural unit represented by formula $(C_3H_4O_2)_n$, where n is an integer. Polyaspartic acid comprises a repetitive structural unit represented by formula $(C_4H_5NO_4)_n$, where n is an integer. Oligosaccharides comprise repetitive 2 to 10 structural saccharide units such as glucose, fructose galactose, xylose and ribose. Saccharides are commonly referred to as carbohydrates or sugars. Common derivatives of saccharides are, for example, sugar alcohols.

The sodium ions in the present acidic mixture are generally provided in the form of a sodium salt, such as sodium hydroxide, sodium carbonate or sodium chloride, preferably sodium hydroxide.

The present acidic mixture comprises water which preferably is deionised water or distilled water.

The pH of the present acidic mixture is equal to, or lower, than ph 5, such as a pH of 5, 4.9, 4.8, 4.7, 4.6, 4.5, 4.4, 4.3, 4.2, 4.1, 4, 3.9, 3.8, 3.7, 3.6, 3.5, 3.4, 3.3, 3.2, 3.1, 3, 2.9, 2.8, 2.7, 2.6, 2.5, 2.4, 2.3, 2.2, 2.1, 2, 1.9, 1.8, 1.7, 1.6, 1.5, 1.4, 1.3, 1.2, 1.1, or 1.

According to the present invention, the temperature of the present acidic mixture is maintained in a range of from 80° C. to 130° C. until a homogeneous suspension is obtained. Obtaining a homogeneous suspension according to the present invention can be readily visually determined by establishing whether the mixture appears to be uniform, or homogenous, by the naked eye.

According to the present invention, it is essential to maintain the temperature of the present acidic mixture in a range of between 80° C. and 130° C., such at 85, 90, 95, 100, 105, 110, 115, 120, or 125° C., preferably between 90° C. and 115° C., more preferably between 100° C. and 110° C. At temperatures above 130° C., the oligosaccharides will exhibit undesired chemical reactions such as caramelization or decomposition while at temperatures below 80° C. insufficient, or no, chemical reactivity, such chemical bonding, is observed between the constituents of the acidic mixture. Similar considerations apply to maintaining the temperatures in the ranges indicated in the present step (c).

According to step (c), polyvinyl alcohol (PVA) and a polycarboxylic acid, or a derivative thereof, are added to the homogenous mixture of step (b). Polyvinyl alcohol (PVA) has a repeating structural unit represented by formula $(C_2H_4O)_n$ wherein n is an integer. A polycarboxylic acid is a hydrocarbon with having at least two —COOH groups, such as two, three, or four carboxylic groups.

According to the present invention, after adding polyvinyl alcohol (PVA) and a polycarboxylic acid, or a derivative thereof, to the homogenous mixture of step (b), the temperature is maintained at the ranges indicated above until a biodegradable polymer is formed. The formation of a biodegradable polymer can readily be observed by establishing the formation of a gel-like structure which, upon cooling, will form a solid structure.

According to the present invention, one or more of the steps of the present method, such as step (a), (b), and/or (c) are preferably performed under continuous mixing such as mechanical stirring.

According to a preferred embodiment of the first aspect of the present invention, the acidic mixture of step (a) comprises by weight percentage of the total weight of the biodegradable polymer:
5% to 60% polyacrylic acid and/or polyaspartic acid;
3%, or less, sodium ions; and
2% to 30% one or more oligosaccharides, or derivatives thereof.

According to another preferred embodiment of the first aspect of the present invention, in step (d), are added by weight percentage of the total biodegradable polymer:
0.1 to 20% polyvinyl alcohol; and
0.1 to 3% of polycarboxylic acid, or a derivative thereof.

According to yet another preferred embodiment of the first aspect of the present invention, the present acidic mixture of step (a) has a pH of 1 to 4.5, preferably 3.5 to 4 such as a pH of 4.4, 4.3, 4.2, 4.1, 4, 3.9, 3.8, 3.7, 3.6, 3.5, 3.4, 3.3, 3.2, 3.1, 3, 2.9, 2.8, 2.7, 2.6, 2.5, 2.4, 2.3, 2.2, 2.1, 2, 1.9, 1.8, 1.7, 1.6, 1.5, 1.4, 1.3, 1.2, 1.1, or 1. The present inventors have surprisingly found that by carefully controlling, or maintaining, a pH of the indicated range, and especially a pH in the range of 3.5 to 4, optionally in combination with the above indicated temperature ranges, optimal reaction, or crosslinking, conditions are provided resulting in biodegradable polymers with excellent characteristics.

According to still another preferred embodiment of the first aspect of the present invention, the present acidic mixture of step (a) comprises by weight percentage of the total weight of the biodegradable polymer: 5% to 60% polyacrylic acid and/or polyaspartic acid, preferably 5 to 55%.

According to a further preferred embodiment of the first aspect of the present invention, the present acidic mixture of step (a) comprises, by weight percentage of the total weight of the biodegradable polymer, 0.05% to 2% sodium ions such as 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.55, 1.6, 1.65, 1.7, 1.65, 1.7, 1.75, 1.8, 1.85, 1.9, 1.95, 2.0%. The present inventors have surprisingly found that by carefully controlling the amount of sodium ions, optionally in combination with the above indicated temperature and pH ranges, optimal reaction, or crosslinking, conditions are provided resulting in biodegradable polymers with excellent characteristics.

According to yet a further preferred embodiment of the first aspect of the present invention, the present acidic mixture of step (a) comprises by weight percentage of the total weight of the biodegradable polymer 2% to 25%, preferably 2% to 20%, of one or more oligosaccharides, or derivatives thereof. The present oligosaccharides can comprises 2, 3, 4, 5, 6, 7, 8, 9 or 10 saccharide units.

Preferred oligosaccharides according to this embodiment of the present invention are di- and/or trisaccharides, preferably selected from the group consisting of sucrose, maltose, lactose, nigerotriose, maltotriose, melezitose, sugar alcohols, mannitol, sorbitol, xylitol, maltitol and lactitol.

According to also a preferred embodiment of the first aspect of the present invention, the present one or more polycarboxylic acid, such as two or more or three or more, is a di- or tricarboxylic acid preferably chosen from the group consisting of citric acid, isocitric acid, aconitic acid, tricarballylic acid, succinic acid, maleic acid, citrofol a1 and citrofol b1, preferably citric acid and/or citrofol b1.

According to this preferred embodiment, the one or more polycarboxylic acids are added, by weight percentage of the total weight of the biodegradable polymer in an amount of 0.1% to 2.5%, preferably 0.2% to 2%, more preferably 0.3% to 1%, most preferably 0.5%.

The polycarboxylic acid can be unsubstituted or substituted by any rest alkyl, alkenyl, alcynyl, acyl, aryl of any length. The derivatives of the polycarboxylic acids can be esters or amides. Citrofol a1 and b1 are known by IUPAC as triethyl and tributyl citrate, respectively.

According to the present invention, polyvinyl alcohol (PVA) is added to the mixture of step (b) while maintaining the temperature in a range of from 80° C. to 130° C. until the biodegradable polymer is formed. According to a preferred embodiment, polyvinyl alcohol (PVA) is added, by weight percentage of the total weight of the biodegradable polymer, in an amount of 0.1% to 20%, preferably 0.5% to 15%, more preferably 1% to 10%, most preferably 1% to 5%.

According to the present invention, the present methods for preparing a biodegradable polymer as outlined above preferably comprise preparing an acidic mixture comprising one or more vegetable and/or animal oils and/or fats selected from the group consisting of rapeseed oil, olive oil, caraway oil, soy oil, walnut oil, hazelnut oil, peanut oil or peanut butter, coconut butter, lemon oil, sheep fat, beef fat, and fish oil.

According to this preferred embodiment, the methods of the present invention comprise one or more vegetable and/or animal oils and/or fats are added to the acidic mixture, by weight percentage of the total weight of the biodegradable polymer, in an amount of 0.1% to 5%, preferably 0.1% to 4%.

Preferably, the method according to the present invention comprises further adding in step (d), by weight percentage of the total weight of the biodegradable polymer, 0.5% to 20% mono- and/or disaccharides and/or one or more such as one or more, such as two or more, three or more, four or more, five or more, hydrophobic silica and/or silicate, preferably aerosil R972 and/or sodium silicates, in an amount of 0.01% to 5%, preferably 0.02% to 3%, more preferably 0.05% to 1%.

Hydrophobic silica is silica that has hydrophobic groups chemically bonded to the surface. Hydrophobic silica can be made both from fumed and precipitated silica. The hydrophobic groups are normally alkyl or polydimethylsiloxane chains. Sodium silicates can be, for example, $Na_2SiO_3$, $Na_4SiO_4$, $Na_6Si_2O_7$.

According to yet another preferred embodiment of the methods according to the present invention, present step (a) and/or step (d) further comprise adding, by weight percentage of the total weight of the biodegradable polymer, 0.05% to 5%, preferably 0.1% to 4%, more preferably 0.2% to 3%, either in total amounts or separate amounts, of one or more additives. The present one or more additives are preferably selected form the group consisting glycerol, gluconic acid, di-acetal, sodium sulphate, and biocide.

Glycerol, or propane-1,2,3-triol, and gluconic acid are polyols, hydrocarbons with more than one alcohol (—OH) organic group. The respective formulae are $C_3H_5(OH)_3$ and $C_6H_{12}O_7$. Other polyols may also be suitable.

Biocides according to the present invention are chemical compounds capable of killing living organisms, usually in a selective way. Biocides are commonly used in medicine, agriculture, forestry and in industry where they prevent the fouling of water and oil pipelines. Some compounds used as biocides are also employed as anti-fouling agents or disinfectants under other conditions.

According to the present invention, suitable additional additives are anticaking agents, antioxidizing agents, antifoaming agents, or colouring.

According to an especially preferred embodiment of the first aspect of the present invention, the present methods further comprising step (d) comprising shaping the biodegradable polymer obtained in step (c) by a process chosen from the group consisting of extrusion, thermoforming, injection molding, blow molding, coating, spinning, rolling, compression molding, and transfer molding.

Extrusion is a process used to create objects of a fixed cross-sectional profile. A material is pushed or drawn through a die of the desired cross-section.

Thermoforming is a manufacturing process where a plastic sheet is heated to a pliable forming temperature, formed to a specific shape in a mold, and trimmed to create a usable product. The sheet, or "film" when referring to thinner gauges and certain material types, is heated in an oven to a high-enough temperature that it can be stretched into or onto a mold and cooled to a finished shape.

Injection molding is a manufacturing process for producing parts from both thermoplastic and thermosetting plastic materials. Material is fed into a heated barrel, mixed, and forced into a mold cavity where it cools and hardens to the configuration of the mold cavity. Injection molding is widely used for manufacturing a variety of parts, from the smallest component to entire body panels of cars.

Blow molding, also known as blow forming, is a manufacturing process by which hollow plastic parts are formed. It is a process used to produce hollow objects from thermoplastic. First, a preform (or parison) of hot plastic resin in a somewhat tubular shape is created. Second, a pressurized gas, usually air, is used to expand the hot preform and press it against a mold cavity. The pressure is held until the plastic cools. This action identifies another common feature of blow molded articles. Part dimensional detail is better controlled on the outside than on the inside, where material wall thickness can alter the internal shape. Once the plastic has cooled and hardened the mold opens up and the part is ejected.

Compression molding is a method of molding in which the molding material, generally preheated, is first placed in an open, heated mold cavity. The mold is closed with a top force or plug member, pressure is applied to force the material into contact with all mold areas, while heat and pressure are maintained until the molding material has cured.

Transfer molding is a process where the amount of molding material is measured and inserted before the molding takes place. The molding material is preheated and loaded into a chamber known as the pot. A plunger is then used to force the material from the pot through channels known as a sprue and runner system into the mold cavities. The mold remains closed as the material is inserted and is opened to release the part from the sprue and runner. The mold walls are heated to a temperature above the melting point of the mold material; this allows a faster flow of material through the cavities.

According to still another preferred embodiment of the first aspect of the present invention, the present biodegradable polymer before step (d), is mixed with another polymer, preferably a biodegradable polymer. This aspect of the present invention allows for applying the present method in a recycling process.

The biodegradable polymers obtained by the present invention provide excellent properties besides biodegradability, such as, amongst others, thermal stability, resistance to oxidation, and/or high mechanical resistance or strength.

Accordingly, the present invention relates to, according to a second aspect, biodegradable polymers obtainable by the methods as outlined above.

The present biodegradable polymers can suitably be used for a number of applications.

Accordingly, the present invention relates to, according to a third aspect, the use of the present biodegradable polymers wherein the use is selected from the group consisting of for coating surfaces, as a protective layer, for thermal insulation, for anti-oxidation insulation, for the manufacture of packaging materials, the manufacture of food containers, and the manufacture of food protective films.

The present invention will be further outlined and detailed in the following examples of preferred embodiments of the present invention. These examples are not provided to limit the scope of the present invention in any way since the scope of the present invention is only determined by the appended claims. In the examples, reference is made to figures wherein:

EXAMPLES

Example 1

Five samples of the present biodegradable polymers were prepared. The constituents of these polymers are presented in Table 1. The biodegradable polymers can suitably used in any applications where usual petroleum based polymer are used, from food industry to medicine, for manufacture of plastic tools, for coating of metallic devices such as apparatus made of stainless steel, titanium, aluminum, as well as in packaging industry, such as protective films or food (or non-food) packaging.

TABLE 1

Biodegradable polymer of five samples

| | % in weight of total polymer | | | | |
|---|---|---|---|---|---|
| | A | B | C | D | E |
| PVA | 2.40 | 1.20 | 4.86 | 1.00 | 1.32 |
| PAA | 7.48 | 6.25 | 35 | 39.06 | 48.73 |
| Sodium ions | 0.10 | 0.75 | 0.70 | 1.55 | 1.46 |
| Glycerol | 0.50 | — | 0.70 | 3.0 | 0.98 |
| Mannitol | — | — | — | 0.78 | — |
| Sucrose | 20.00 | 9.50 | 7.00 | 3.90 | 4.87 |
| Citrofol b1 | 0.50 | — | — | — | — |
| Citric acid | — | 0.50 | 0.50 | 0.50 | 0.50 |
| Sodium silicate | 0.06 | — | 0.70 | — | — |
| Aerosil R972 | — | 0.50 | — | — | 0.10 |

TABLE 1-continued

Biodegradable polymer of five samples

| | % in weight of total polymer | | | | |
|---|---|---|---|---|---|
| | A | B | C | D | E |
| Ethanol | 0.50 | — | — | — | — |
| Rapeseed oil | 2.80 | — | — | — | — |
| Sunflower oil | — | — | 0.20 | — | — |
| Sheep fat | — | — | 0.70 | — | — |
| Soy oil | — | — | — | 0.90 | — |
| Almond oil | — | — | — | — | 3.87 |
| Emulsifier | 0.20 | — | 0.50 | 0.75 | 1.00 |

Example 2

The stability of the above biodegradable polymers A to E has been studied through the thermal behavior with respect to degradation and melting point. Representative thermogravimetric analyses (TGA) and differential scanning calorimetry (DSC) curves are presented in FIGS. 1 and 2 showing a general trend for the biodegradable polymers of the present invention.

Figure 1:
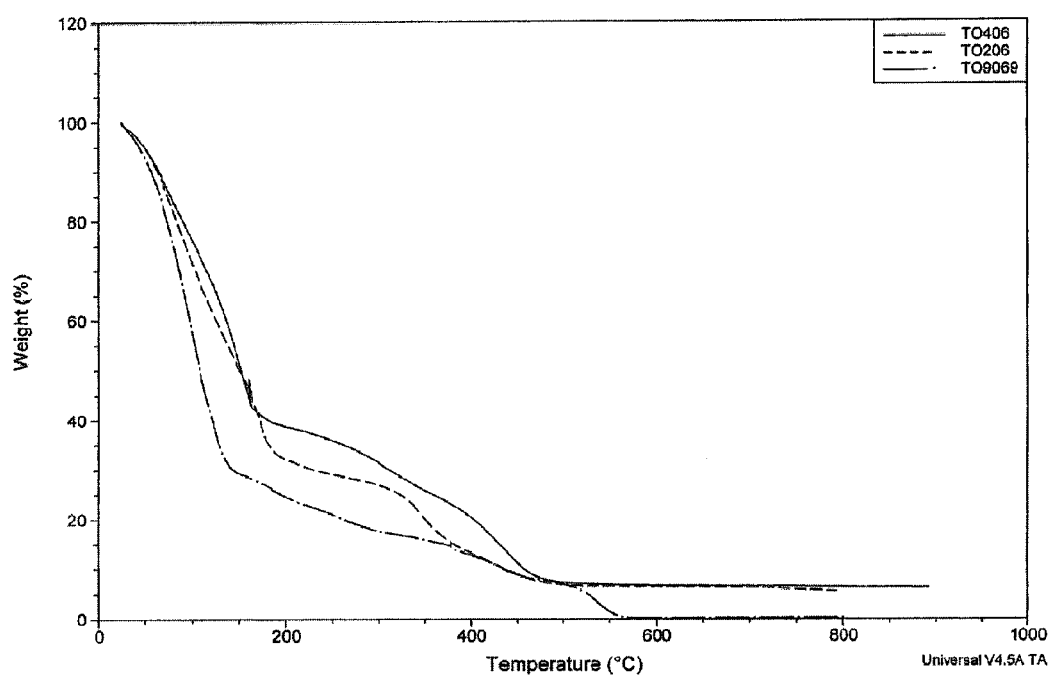
FIG. 1 represents the TGA of three biodegradable polymer batches

FIG. 1 presents the thermogravimetric analysis of three different biodegradable polymers (A, B and C). The samples tested show no degradation up to a temperature of 388° C. Degradations were observed between 388° C. and 489° C. The present biodegradable polymers are therefore able to be heated and undergo high temperatures with no degradation.

Figure 2:
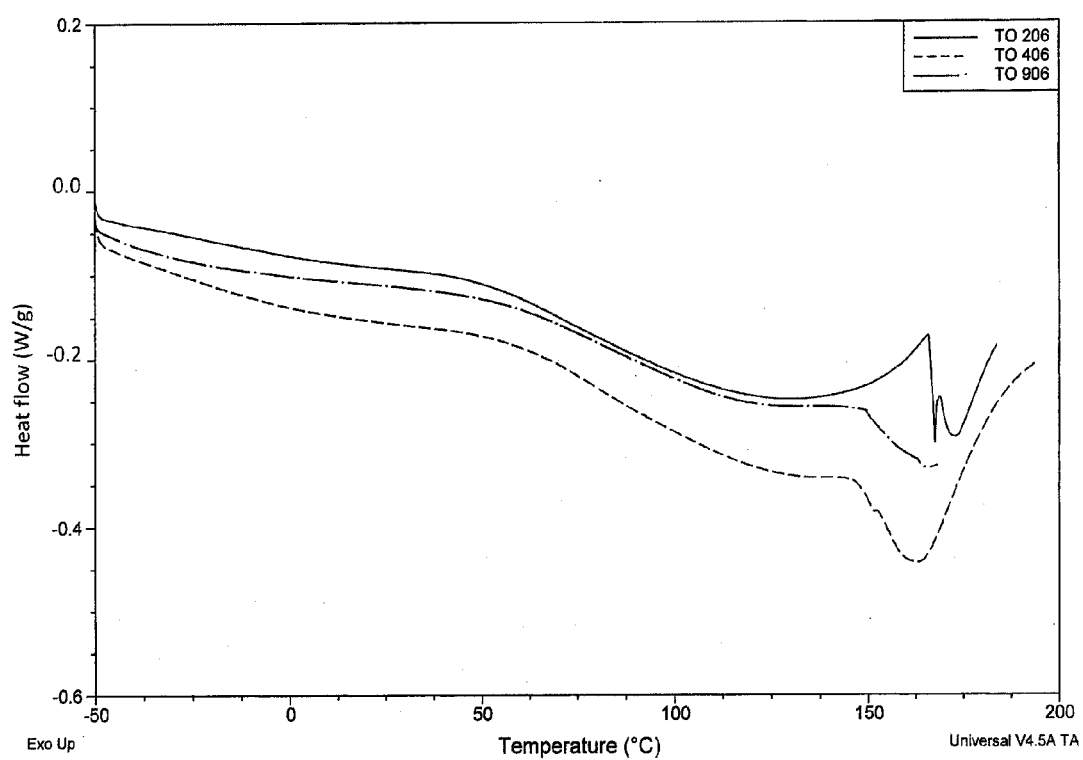
FIG. 2 represents the DSC of three biodegradable polymer batches

FIG. 2 presents the calorimetric measurements and shows an endothermic melting process. The melting temperature is measured at 130.35° C.

Example 3

Oxidative induction time (OIT) was performed in a DSC and allowed to measure the level of stabilization of the material. OIT was carried out on the biodegradable polymers according to the invention. All biodegradable polymers tested (A to E) showed an improved stability to heat up to 150° C. in increased oxygen atmosphere.

Example 4

Figure 3:
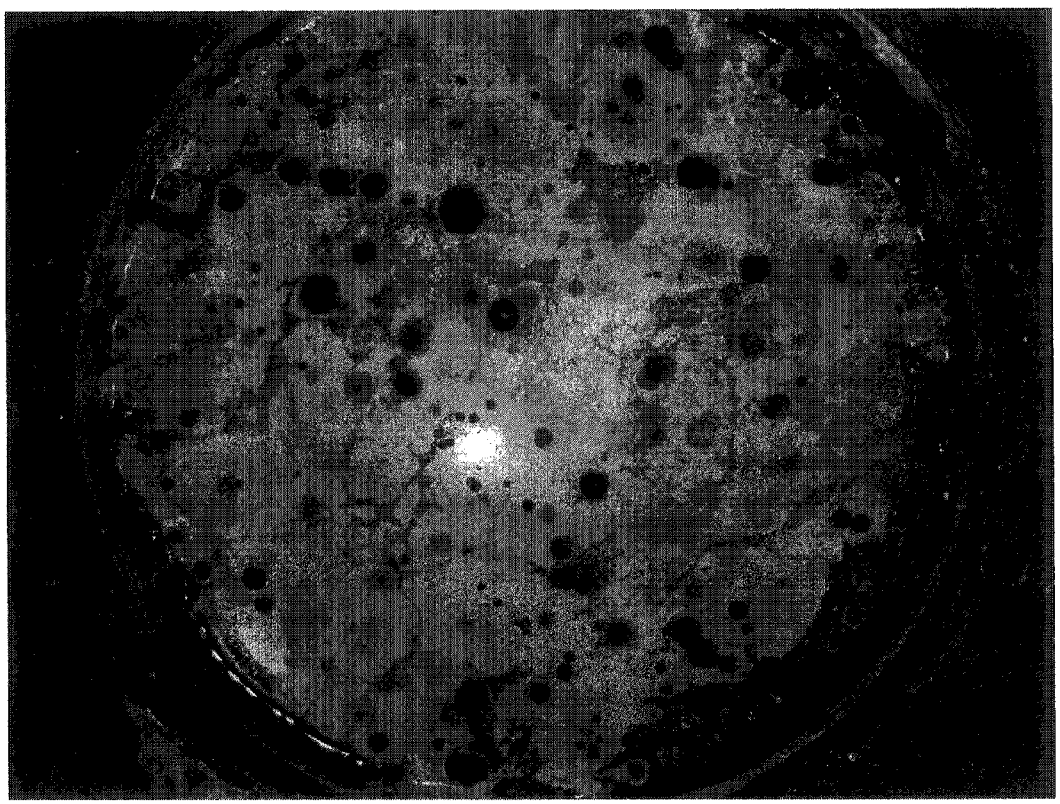
FIG. 3 shows bacterial studies with a biodegradable polymer as support

FIG. 3 shows a representative picture of a biodegradable polymer according to the present invention, i.e., A, used for bacterial growth. The biodegradable polymer had no anti-bacterial additives. Biodegradation by the bacteria can be readily observed. Similar results were obtained for polymers B to E.

The biodegradable polymers according to the invention can accordingly be used for bacterial growth or micro-organism culture. However, the presence of anti-bacterial additives can be desirable for the manufacture of sterile materials or for medical purposes.

Example 5

The elastic properties and resistance to breakage have been determined for five biodegradable polymer batches, i.e., A to E, through tensile tests. The Young modulus E and resistance to forces of the biodegradable polymer samples is comparable to, or better than, commercially available polymers.

TABLE 2

Tensile tests with 2 kN load cell and speed of 5 mm/min

| Sample | Width (mm) | Thickness (mm) | E-Modulus MPa | Stain Fmax % | Stress N/mm$^2$ | Strain break % |
|---|---|---|---|---|---|---|
| A | 5 | 0.2 | 749.68 | 225.63 | 27.80 | 229.58 |
| B | 5 | 0.32 | 425.89 | 255.25 | 23.86 | 259.71 |
| C | 5 | 0.37 | 330.56 | 255.33 | 18.63 | 271.62 |
| D | 5 | 0.36 | 370.87 | 298.45 | 21.78 | 305.40 |
| E | 5 | 0.5 | 281.46 | 284.79 | 21.01 | 293.00 |

The invention claimed is:

1. Method for preparing a biodegradable polymer comprising:
    a) preparing an acidic mixture of polyacrylic and/or polyaspartic acid, sodium ions, one or more oligosaccharides, or derivatives thereof, and water, wherein the resulting mixture has a pH equal to or lower than 5;
    b) maintaining the temperature of said acidic mixture in a range of from 80° C. to 130° C. until an homogeneous suspension is obtained; and
    c) adding polyvinyl alcohol (PVA) and one or more polycarboxylic acids, or derivatives thereof, to the mixture of step (b) while maintaining the temperature in a range of from 80° C. to 130° C. until the biodegradable polymer is formed.

2. Method for preparing a biodegradable polymer according to claim 1, wherein the acidic mixture of step (a) comprises by weight percentage of the total weight of the biodegradable polymer:
    5% to 60% polyacrylic acid and/or polyaspartic acid;
    3%, or less, sodium ions; and
    2% to 30% one or more oligosaccharides, or derivatives thereof.

3. Method for preparing a biodegradable polymer according to claim 1, wherein, in step (d), are added by weight percentage of the total weight of the biodegradable polymer:
    0.1 to 20% polyvinyl alcohol; and
    0.1 to 3% of polycarboxylic acid, or a derivative thereof.

4. Method for preparing a biodegradable polymer according to claim 1, wherein the mixture of step (a) has a pH in the range of 1 to 4.5, more preferably 3.5 to 4.

5. Method for preparing a biodegradable polymer according to claim 1, wherein the acidic mixture of step (a) comprises by weight percentage of the total weight of the biodegradable polymer: 5% to 60% polyacrylic acid and/or polyaspartic acid, preferably 5 to 55%.

6. Method for preparing a biodegradable polymer according to claim 1, wherein the sodium ions are provided by adding sodium hydroxide to the acidic mixture of step (a).

7. Method for preparing a biodegradable polymer according to claim 1, wherein the acidic mixture of step (a) comprises by weight percentage of the total weight of the biodegradable polymer 0.05% to 2% sodium ions.

8. Method for preparing a biodegradable polymer according to claim 1, wherein the acidic mixture of step (a) comprises by weight percentage of the total weight of the biodegradable polymer 2% to 25%, preferably 2% to 20%, one or more oligosaccharides, or derivatives thereof.

9. Method for preparing a biodegradable polymer according to claim 1, wherein the one or more oligosaccharides are di- and/or trisaccharides.

10. Method for preparing a biodegradable polymer according to claim 1, wherein the one or more oligosaccharides, or derivatives thereof, are selected from the group consisting of sucrose, maltose, lactose, nigerotriose, maltrotriose, melezitose, sugar alcohols, mannitol, sorbitol, xylitol, maltitol and lactitol.

11. Method for preparing a biodegradable polymer according to claim 1, wherein the polycarboxylic acid is a di- or tricarboxylic acid chosen from the group consisting of citric acid, isocitric acid, aconitic acid, tricarballylic acid, succinic acid, maleic acid, citrofol a1 and citrofol b1, preferably citric acid and/or citrofol b1.

12. Method for preparing a biodegradable polymer according to claim 1, wherein, in step (d), are added by weight percentage of the total weight of the biodegradable polymer 0.1% to 2.5%, preferably 0.2% to 2%, more preferably 0.3% to 1%, most preferably 0.5% polycarboxylic acid, or a derivative thereof.

13. Method for preparing a biodegradable polymer according to claim 1, wherein, in step (d), are added by weight percentage of the total weight of the biodegradable polymer 0.1% to 20%, preferably 0.5% to 15%, more preferably 1% to 10%, most preferably 1% to 5% polyvinyl alcohol.

14. Method for preparing a biodegradable polymer according to claim 1, wherein the temperature of step (b) is maintained in a range of 85° C. to 120° C., more preferably 90° C. to 115° C., most preferably 100° C. to 110° C.

15. Method for preparing a biodegradable polymer according to claim 1, wherein the temperature of step (c) is maintained in a range of 85° C. to 120° C., more preferably 90° C. to 115° C., most preferably 100° C. to 110° C.

16. Method for preparing a biodegradable polymer according to claim 1, wherein the mixture in step (a) further comprises one or more vegetable and/or animal oils and/or fats selected from the group consisting of rapeseed oil, olive oil, caraway oil, soy oil, walnut oil, hazelnut oil, peanut oil or peanut butter, coconut butter, lemon oil, sheep fat, beef fat, and fish oil.

17. Method for preparing a biodegradable polymer according to claim 16, wherein the acidic mixture of step (a) comprises by weight percentage of the total weight of the biodegradable polymer 0.1% to 5%, preferably 0.1% to 4% of one or more vegetable oils and/or fats.

18. Method for preparing a biodegradable polymer according to claim 1, wherein, in step (d), are further added by weight percentage of the total weight of the biodegradable polymer 0.5% to 20% mono- and/or disaccharides.

19. Method for preparing a biodegradable polymer according to claim 1, wherein, in step (d), are further added by weight percentage of the total weight of the biodegradable polymer 0.01% to 5%, preferably 0.02% to 3%, more preferably 0.05% to 1% of one or more hydrophobic silica and/or silicate.

20. Method for preparing a biodegradable polymer according to claim 19, wherein one or more hydrophobic silicates are sodium silicates.

21. Method for preparing a biodegradable polymer according to claim 1, wherein step (a) and/or step (d) further comprises, by weight percentage of the total weight of the biodegradable polymer, adding 0.05% to 5%, preferably 0.1% to 4%, more preferably 0.2% to 3% of one or more additives, preferably selected form the group consisting of glycerol, gluconic acid, di-acetal, sodium sulphate, and biocide.

22. Method for preparing a biodegradable polymer according to claim 1, further comprising step (d) comprising shaping the biodegradable polymer obtained in step (c) by a process chosen from the group consisting of extrusion, thermoforming, injection molding, blow molding, coating, spinning, rolling, compression molding, and transfer molding.

23. Method for preparing a biodegradable polymer according to claim 22, wherein the biodegradable polymer, before step (d), is mixed with another polymer, preferably a biodegradable polymer.

24. Biodegradable polymer obtainable by a method according to claim 1.

* * * * *